Figure 1:
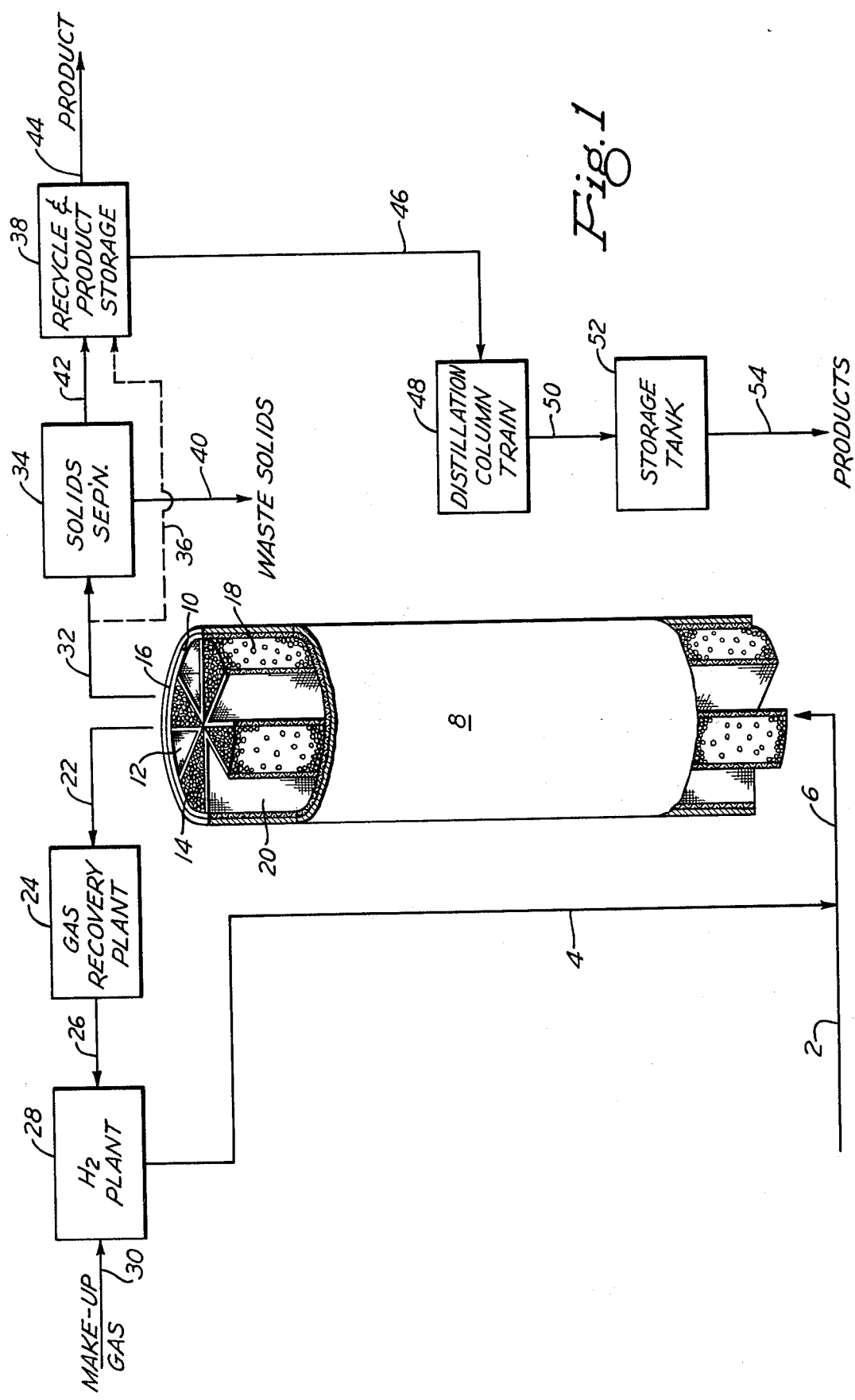

United States Patent [19]

Chun et al.

[11] 3,950,244

[45] Apr. 13, 1976

[54] PROCESS FOR TREATING A SOLID-CONTAINING LIQUID HYDROCARBON OIL

[75] Inventors: Sun W. Chun, Murrysville; Donald C. Cronauer, Gibsonia; Thomas W. Leslie, Blawnox, all of Pa.

[73] Assignee: Gulf Research & Development Company, Pittsburgh, Pa.

[22] Filed: June 24, 1974

[21] Appl. No.: 482,079

Related U.S. Application Data

[60] Continuation-in-part of Ser. No. 441,604, Feb. 11, 1974, Division of Ser. No. 226,503, Feb. 15, 1972, abandoned.

[52] U.S. Cl............................. 208/143; 208/216
[51] Int. Cl.² .................................... C10G 23/00
[58] Field of Search ............ 208/143, 144, 10, 146, 208/216; 23/288 R

[56] References Cited

UNITED STATES PATENTS

| | | | |
|---|---|---|---|
| 1,934,023 | 11/1933 | Wright | 208/10 |
| 2,108,087 | 2/1938 | Thayer | 23/288 R |
| 2,181,153 | 11/1939 | Prickett | 23/288 R |
| 2,245,145 | 6/1941 | Hall et al. | 23/288 R |
| 2,257,178 | 9/1941 | Martin et al. | 208/146 |
| 2,276,340 | 3/1942 | Prickett et al. | 23/288 R |
| 2,288,943 | 7/1942 | Eastman | 23/288 F |
| 2,338,063 | 12/1943 | Simpson et al. | 208/146 |
| 3,092,674 | 6/1963 | Bray et al. | 260/680 R |
| 3,477,833 | 11/1969 | McMullin et al. | 23/288 R |
| 3,509,043 | 4/1970 | McMaster et al. | 208/146 |
| 3,707,831 | 1/1973 | Dautzenberg et al. | 23/288 F |
| 3,796,655 | 3/1974 | Armistead et al. | 208/216 |

*Primary Examiner*—Delbert E. Gantz
*Assistant Examiner*—James W. Hellwege

[57] ABSTRACT

A process is provided for the conversion of solid-containing liquid hydrocarbon oils, and in particular for the hydrogenation of solid-containing liquid hydrocarbon oils derived from coal, oil shale and tar sands. The process comprises passing a solid-containing liquid hydrocarbon oil, together with hydrogen, through a reaction vessel that contains a plurality of reaction zones separated by porous partitions. A portion of said zones is adapted to contain a solid particulate hydrogenation catalyst which will not pass through said porous partitions. The remainder of said zones form substantially unobstructed passageways through said reaction vessel. The volumetric ratio of catalyst zones to substantially unobstructed passageways is about 10:1 to about 1:10.

13 Claims, 8 Drawing Figures

PROCESS FOR TREATING A SOLID-CONTAINING LIQUID HYDROCARBON OIL

This application is a continuation-in-part application of our U.S. application Ser. No. 441,604, filed Feb. 11, 1974, entitled PROCESS AND APPARATUS FOR THE CONVERSION OF CARBONACEOUS MATERIALS, the latter being a division of our U.S. application Ser. No. 226,503, bearing the same title, filed Feb. 15, 1972 now abandoned.

This invention relates to an improved process for the conversion of solid-containing liquid hydrocarbon oils, particularly solid-containing liquid hydrocarbon oils derived from coal, oil shale and tar sands. By "liquid hydrocarbon oils" we mean to include the organic liquid hydrocarbons obtained from the physical and/or chemical treatment of coal, oil shale and tar sands.

Liquid hydrocarbon oils can contain solids that can interfere with subsequent processing thereof. These solids can be those which find their way into the liquid hydrocarbon oils during production thereof, while in storage or during processing. Solid-containing liquid hydrocarbon oils that are preferably treated herein are solid-containing liquid hydrocarbon oils derived from coal, oil shale and tar sands.

These liquid hydrocarbon oils are old and well-known and can be obtained in many ways. Reference, for example, for obtaining or producing these oils can be found in Kirk-Othmer Encyclopedia of Chemical Technology, Second Edition, 1969, John Wiley & Sons, Inc., New York, New York: Volume 5, pages 606 to 678, for liquid hydrocarbon oils derived from coal; Volume 18, pages 1 to 20, for liquid hydrocarbon oils derived from oil shale; and Volume 19, pages 682 to 732, for liquid hydrocarbon oils derived from tar sands.

While these liquid hydrocarbon oils vary greatly in their composition, in the main they are composed of mono and polynuclear aromatic compounds, some of which can include chemically combined sulfur, nitrogen and/or oxygen. In general, their approximate composition, on a moisture-free, solid-free basis, can be as follows:

TABLE I

| | Weight Per Cent | |
|---|---|---|
| | Broad Range | Narrow Range |
| Carbon | 80– 95 | 83 – 92 |
| Hydrogen | 5 – 15 | 5 – 13 |
| Nitrogen | 0.1 – 4 | 0.1 – 3 |
| Oxygen | 0.1 – 4 | 0.1 – 2.5 |
| Sulfur | 0.1 – 10 | 0.1 – 5 |

The solids that can be associated with the above-identified liquid hydrocarbon oils will contain in excess of about 50 weight per cent of inorganic components, generally from about 60 to about 98 weight per cent. Generally, these inorganic components will be, for example, iron compounds, such as ferric sulfide; silica-containing compounds, such as quartz, kaolin, mica, montmorillonite and zeolites; metal carbonates, such as calcite, dolomite and nahlcolite; etc. Based on the weight of the liquid hydrocarbon oil, the solids content thereof will be in the range of about 0.1 to about 20 weight per cent, generally about 0.1 to about five weight per cent.

The procedure defined herein can be used to improve the physical properties of the liquid hydrocarbon oil, for example, to reduce its gravity, pour point and/or viscosity and/or the chemical properties of the liquid hydrocarbon oil, for example, reduce its sulfur and/or nitrogen content.

In order to upgrade (that is, improve its physical and/or chemical properties) liquid hydrocarbon oils, it is conventional to pass the same, together with hydrogen, through a catalyst-containing ebullating bed reactor or through a catalyst-containing fixed-bed reactor. With an ebullating bed, reactor attrition rates are high and catalyst losses are severe. With a fixed bed, solid carbonaceous materials tend to form at the high temperatures of reaction and deactivation of catalyst and plugging of the reactor soon follow. When the liquid hydrocarbon oil being treated additionally contains solid materials, as herein, even poorer results are obtained, because the presence of solid materials in the liquid hydrocarbon oils aggravate both the attrition and plugging problems noted above. Treating solid-containing liquid hydrocarbon oils in accordance with the process defined and claimed herein not only substantially reduces these attrition and plugging problems but, at the same time, results in the production of a liquid hydrocarbon oil having enhanced physical and/or chemical properties.

The process of the invention, in general, comprises passing a solid-containing liquid hydrocarbon oil, together with hydrogen, into the reaction vessel referred to and described more fully hereinbelow. The reaction vessel contains a conventional hydrogenation catalyst and is maintained under normal hydrogenating pressures and temperatures. The solid-containing liquid hydrocarbon oil is passed through the reaction vessel in unobstructed passageways and under conditions such that the liquid hydrocarbon oil and some of the solid material that may be small enough passes in and out of catalyst segments which are parallel to the flow of slurry. After hydrogenation the solids that were present in the charge can be removed from the product stream. The balance of the product stream can thereafter be subjected to distillation to obtain products of various boiling ranges. Some of the products are useful per se as fuels. The remainder can be further treated by conventional petroleum processes including cracking, hydrocracking, hydrotreating and the like.

In accordance with the present invention, the solid-containing liquid hydrocarbon oil is contacted with hydrogen in the presence of a hydrogenation catalyst at a temperature between about 500° and about 900° F., at a pressure between about 500 and about 10,000 pounds per square inch gauge (psig), and preferably at a pressure between about 1000 and 4000 psig, utilizing a weight hourly space velocity (WHSV) between about 0.25 and about 50 pounds of liquid hydrocarbon oil per pound of catalyst per hour, and added hydrogen in amounts between about 2000 and about 20,000 standard cubic feet (SCF) per barrel of solid-containing liquid hydrocarbon oil. The exact conditions selected will depend upon the catalyst, the particular charge stock to be treated, and the degree of physical and/or chemical conversion desired, etc. It is desirable to utilize as low a temperature as possible and still obtain the desired results. This is due to the fact that the degree of activation or promotion of some hydrogenation catalysts becomes more pronounced at the lower reaction temperatures. The hydrogen recycle rate does not vary significantly with various charge stocks and preferably should be between about 2000 and about 10,000 standard cubic feet per barrel of solid-containing liquid hydrocarbon oil.

Any hydrogenation catalyst well-known to those having ordinary skill in the art can be employed herein, but preferably the catalyst which is employed in the process of the invention comprises at least one hydrogenating component selected from the group consisting of the metals, metal sulfides and/or metal oxides of (*a*) a combination of about 2 to about 25 per cent (preferably 4 to 16 per cent) by weight molybdenum and at least two iron group metals where the iron group metals are present in such amounts that the atomic ratio of each iron group metal with respect to molybdenum is less than about 0.4 and (*b*) a combination of about 5 to about 40 per cent (preferably about 10 to about 25 per cent) by weight of nickel and tungsten where the atomic ratio of tungsten to nickel is about 1:0.1 to about 5 (preferably about 1:0.3 to about 4), said hydrogenating component being composited with a porous support. Particularly preferred among the hydrogenating metals are nickel, cobalt, molybdenum and tungsten. Catalysts of type (*a*) may contain molybdenum in the amounts conventionally used, i.e., about 2 to about 25 per cent molybdenum based on the total weight of the catalyst including the porous carrier. Smaller amounts of molybdenum than about 2 per cent may be used but this reduces the activity. Larger amounts than about 25 per cent can also be used but do not increase the activity and constitute an extra expense. We prefer to utilize a catalyst containing about 4 to about 16 per cent by weight molybdenum, most preferably about 10 per cent; about 2 to about 10 per cent by weight nickel, most preferably about 2 per cent; and about 1 to about 5 per cent by weight cobalt, most preferably about 1.5 per cent. While a three-metal component catalyst as in (*a*) is preferred, we can also use a two-metal component catalyst as in (*b*). When using a two-metal component catalyst, we prefer to utilize one containing about 15 to about 25 per cent (e.g., about 19 per cent) tungsten and about 2 to about 10 per cent (e.g., about 6 per cent) nickel supported on a porous carrier such as alumina. In a two-metal component catalyst, the weight ratio of tungsten to nickel is preferably in the range of about 2:1 to about 4:1 tungsten to nickel, respectively. The amounts of the iron group metals in (*a*) and (*b*) may be varied as long as the above proportions are used. However, in ( *a*) we prefer to utilize one iron group metal in an atomic ratio between about 0.1 and about 0.2 and to use the other iron group metal or metals in an atomic ratio of iron group metal to molybdenum of less than about 0.1 and especially between about 0.05 and about 0.1. All of the iron group metals may be present but we prefer to use only two. The amount of the hydrogenating component based on the metal itself can suitably be from about 0.5 to about 60 per cent by weight of the catalyst including the porous carrier, but is usually within the range of about 2 to about 30 per cent by weight of the catalyst including the carrier.

The above-mentioned active hydrogenating components can also be present as mixtures. On the other hand, chemical combinations of the iron group metal oxides or sulfides with the molybdenum oxide and/or sulfide can be utilized. The catalytic hydrogenating components can be used with a variety of highly porous bases or supports which may or may not have catalytic activity of their own. Examples of such supports are alumina, bauxite, silica gel, kieselguhr, thoria, zirconia, molecular sieves or other zeolites, both natural and synthetic, or mixtures of the foregoing, as long as the particular catalyst support which is employed has pores sufficiently large to avoid quick plugging by the deposition of the ash and/or organo-metallic constituents or other solids of the charge stock. By "highly porous" and "pores sufficiently large" is meant a pore volume of from about 0.1 to about 1.0 cc per gram, preferably from about 0.25 to about 0.8 cc per gram; a surface area from about 50 to about 450 m$^2$/gram, preferably from about 80 to about 300 m$^2$/gram; a pore radius size range from about 10 A to about 300 A with the average pore radius being from about 20 A to about 100 A.

The hydrogenation catalysts referred to hereinabove and the method by which they are made are not, per se, a part of the present invention. Methods of preparing such catalysts or combinations of catalysts are well-known in the prior art, such catalysts and methods of preparing the same having been described, for example, in U.S. Pat. No. 2,880,171 which issued to R. A. Flinn and J. B. McKinley on Mar. 31, 1959.

The particle size of the composited catalyst can suitably be from about 1/32 inch diameter to about ¼ diameter extrudate, or about diameter 1/32 inch to about ¼ inch diameter spheroids. The preferred size of the catalyst particles will depend upon the size of the openings in the porous partitions of the reaction vessel and upon the size of the catalyst sections in the commercial vessel. In general, the larger the catalyst sections in the commercial vessel, the larger should be the catalyst particle size. The catalyst can also be in the form of pellets or any other geometrical form, so long as the catalyst does not pass through the openings in the partitions separating the catalyst bed segments from the unobstructed passageways.

When treating a solid-containing liquid hydrocarbon oil according to the process of the invention, it is customary to continue the reaction until the catalyst activity has decreased markedly due to the deposition of ash and/or coke or other carbonaceous material thereon. In the process of the present invention the reaction will continue over an extended period of time before regeneration of the catalyst is required. When regeneration of the catalyst becomes necessary, the catalyst can be regenerated by combustion, i.e., by contact with an oxygen-containing gas such as air at an elevated temperature usually about 900° F. or by any other means normally used to regenerate hydrogenation catalysts. The manner in which the catalyst is regenerated does not constitute a portion of the present invention.

The process of the invention will be more readily understood by referring to

FIG. 1, which is a schematic flow diagram of one embodiment of the invention showing a preferred form of a multi-partitioned reaction vessel wherein the cross-sectional segments of the vertical reaction zones are sectors.

FIGS. 2 through 8 are schematic drawings showing other configuration of suitable multi-partitioned reaction vessels which can be used in the process of the invention.

Referring to FIG. 1, a solid-containing liquid hydrocarbon oil is introduced into the system by line 2 and hydrogen by line 4. The resulting mixture in line 6 is then passed upwardly into reaction vessel 8. If desired, the mixture in line 6 can be preheated by any suitable heat exchange means (not shown) prior to being introduced into reaction vessel 8. While the mixture of oil and hydrogen is shown as being introduced into the bottom of reaction vessel 8 for upflow operation, the mixture can be introduced into the top of reaction vessel 8 for downflow operation. Preferably, however, the mixture of oil and hydrogen is introduced into the bottom of reaction vessel 8 and passed upflow through reaction vessel 8 in a flooded-bed type reaction system. While the hydrogen is shown as being introduced together with the oil into the bottom of reaction vessel 8, the hydrogen can be introduced at multiple places through the reaction vessel.

The hydrogen is introduced into reaction vessel 8 in amounts between about 2000 and about 20,000 standard cubic feet of hydrogen per barrel of coal slurry. The hydrogen gas stream is preferably at least about 60 per cent hydrogen, the remainder of the gas stream being gases such as nitrogen, carbon monoxide, carbon dioxide and/or low molecular weight hydrocarbons such as methane. The exact reaction conditions in reaction vessel 8 depend upon a number of factors but, in general, include temperatures of about 650° to about 900° F., usually temperatures between about 700° F. and about 875° F., and pressures of about 500 to about 10,000 psig, usually pressures between about 1000 and about 4000 psig. The weight hourly space velocity of the solid-containing liquid hydrocarbon oil is suitably from about 0.5 to about 40, usually about 0.5 to about 20 unit weight of charge stock per unit weight of catalyst per hour. The catalyst can be any hydrogenation catalyst as defined hereinabove, but is preferably a three-metal component catalyst comprising molybdenum, nickel and cobalt supported on a carrier such as alumina. The particle size of the catalyst will depend upon the size of the reaction vessel and upon the size of the openings in the porous partitions of the reaction vessel. The particles of catalyst are sufficiently large so that they do not pass through the openings in the porous partitions.

Reaction vessel 8 can contain one segmented basket 10 or it may contain a number of such baskets stacked on top of each other provided the unobstructed passageways 12 and the catalyst-containing segments 14 are in direct line through the reaction vessel. Basket 10 is in cylindrical shape, the outer surface 16 of which may be solid, but is preferably provided with openings large enough to permit the transfer of reactants (including solids) and products therethrough while retaining the catalyst particles 18 therein. The inner walls 20 of the partitions separating the catalyst segments from the unobstructed passageways are provided with openings large enough to permit the transfer of reactants (including solids) and products therethrough while not allowing catalyst particles to pass from the catalyst segments. In FIG. 1, the cross-sectional configuration of the segments in basket 10 are sectors. Other configurations as shown in FIGS. 2 to 8 will be discussed hereinbelow.

Gases from reaction vessel 8 are removed through line 22 to a gas recovery plant 24. Gas recovery plant 24 comprises any suitable means for separating gases from liquids. The gases separated in gas recovery plant 24 are passed through line 26 to a hydrogen plant 28 where hydrogen is recovered and any low molecular weight hydrocarbon gases are converted to hydrogen. Depending upon economic considerations, the low molecular weight hydrocarbon gases can be sold and hydrogen generated by other satisfactory means, such as gasification of coal, or a product stream containing undesirable materials, such as high-boiling tars or waste solids, can be used as a hydrogen source. Hydrogen is then returned through line 4 to reaction vessel 8. Any makeup gas which is needed to supply hydrogen for the hydrogen plant is added through line 30. Liquid products containing some solid materials are removed from reaction vessel 8 through line 32 into a solids separation unit 34. If desired, solids separation unit 34 can be bypassed, in which case the liquid products removed from reaction vessel 8 can be passed directly by line 36 to a product storage and recycle unit 38. Solids separation unit 34 comprises any suitable means for separating solids from liquids such as a continuous rotating filter, centrifuge or liquid cyclone. Solid materials are removed from the separation unit 34 through line 40. The liquid product is removed from separation unit 34 through line 42 to product storage and recycle unit 38, from which liquid product can be removed through line 44. The liquid product from storage and recycle unit 38 can be sent through line 46 to a distillation column train 48 where various cuts can be removed at a desired pressure, usually under vacuum for the recovery of specific distillation cuts which can then be passed through line 50 to a storage tank farm 52. The various products can then be removed through line 54.

Other exemplary configurations of suitable multi-partitioned baskets providing unobstructed passageways and catalyst-containing segments are shown in FIGS. 2 to 8.

Figure 2:
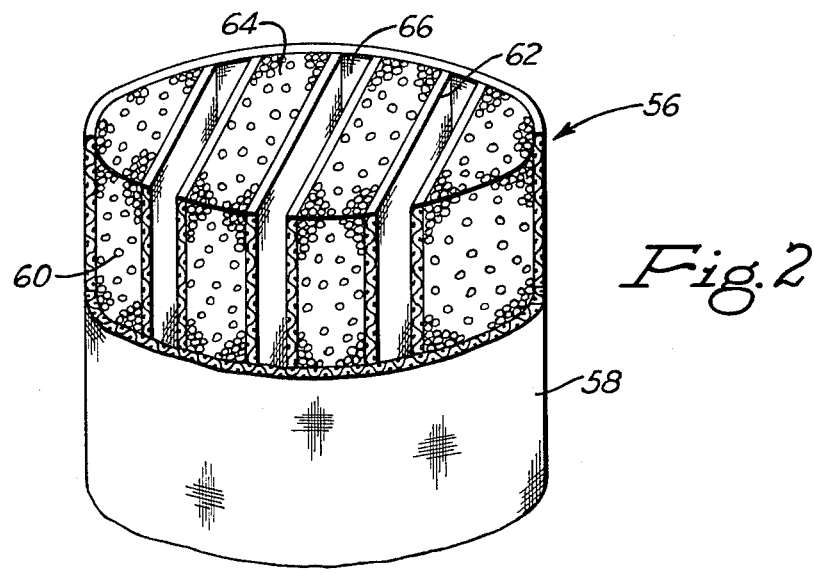

In FIG. 2, a segmented basket 56 is cylindrical in shape, the outer surface 58 of which may be solid, but is preferably provided with openings large enough to permit the transfer of reactants (including solids) and products therethrough while retaining catalyst particles 60 therein. The inner walls 62 of the partitions separating catalyst segments 64 from unobstructed passageways 66 are provided with openings large enough to permit the transfer of reactants (including solids) and products therethrough while not allowing catalyst particles to pass from the catalyst segments. The unobstructed passageways 66 are parallel to the direction of flow of charge stock through the reaction vessel. The unobstructed passageways 66 alternate with catalyst segments 64. The porous partitions shown in FIG. 2 are flat plates vertically placed in substantially parallel planes. The space between the plates may be from about ¼ inch to about ½ inch or more depending upon the size of the reaction vessel. It will be understood that the plates can be either perfectly flat, as shown, or corrugated. The plates are made of metal such as a metal screen wire.

Figure 3:
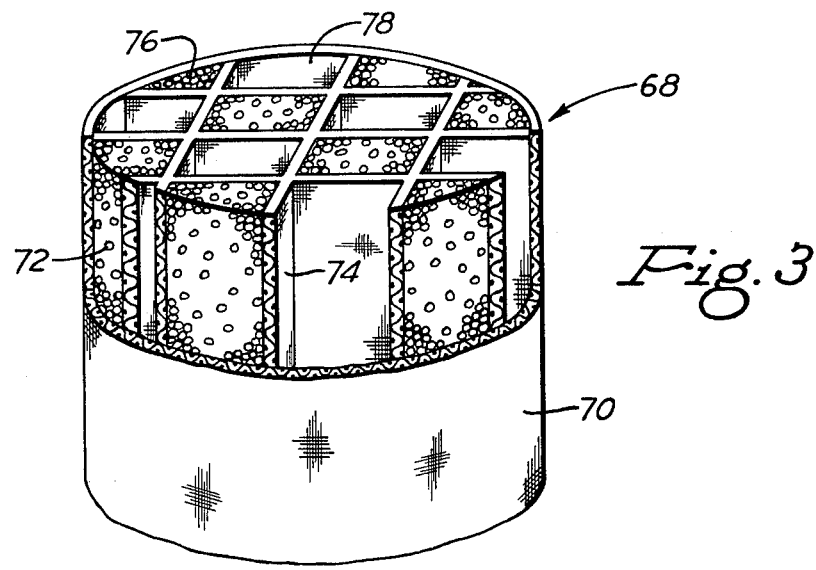

In FIG. 3, a checkerboard or honeycomb-like three-dimensional configuration is shown where segmented basket 68 is cylindrical in shape, the outer surface 70 of which may be solid, but is preferably provided with openings large enough to permit the transfer of reactants (including solids) and products therethrough while retaining catalyst particles 72 therein. The inner walls 74 of the partitions separating catalyst segments 76 from unobstructed passageways 78 are provided with openings large enough to permit the transfer of reactants (including solids) and products therethrough while not allowing catalyst particles to pass from the catalyst segments. The unobstructed passageways 78 are parallel to the direction of flow of charge stock through the reaction vessel. The unobstructed passageways 78 alternate with catalyst segments 76. The porous partitions in FIG. 3 are placed in intersecting planes so as to form a honeycomb-like structure, which leaves alternating upward unobstructed passageways and catalyst zones. The space between the partitions may be from about ¼ inch to about ½ inch or more. The partitions may be made of screen wire.

Figure 4:
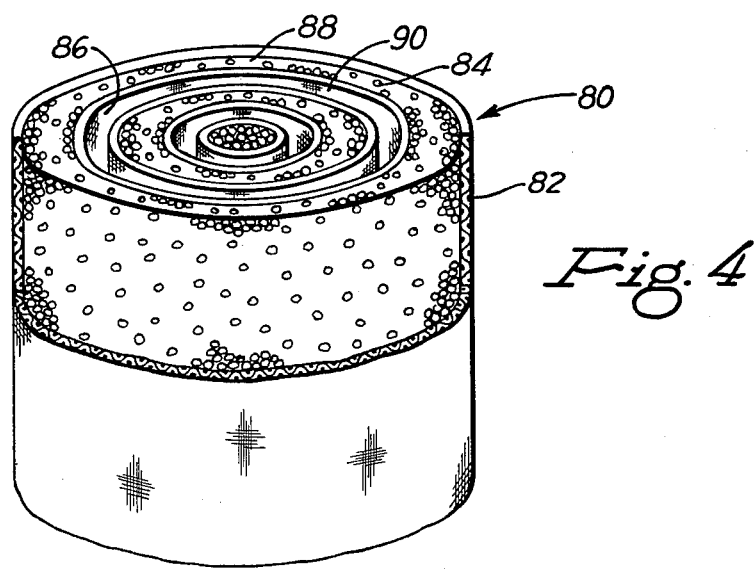

In FIG. 4, a series of concentric cylinders are shown where a multi-partitioned basket 80 is cylindrical in shape, the outer surface 82 of which may be solid, but is preferably provided with openings large enough to permit the transfer of reactants (including solids) and products therethrough while retaining catalyst particles 84 therein. The inner walls 86 of the cylindrical partitions separating catalyst segments 88 from unobstructed passageways 90 are provided with openings large enough to permit the transfer of reactants (including solids) and products therethrough while not allowing catalyst particles to pass from the catalyst segments. The unobstructed passageways 90 alternate with catalyst segments 88. The porous partitions in FIG. 4 are cylindrical in shape, the space between the cylinders being from about ¼ inch to about ½ inch or more depending upon the size of the reaction vessel. It will be understood that the cylinders can be smooth, as shown, or corrugated. The cylinders are made of metal such as a metal screen wire.

Figure 5:
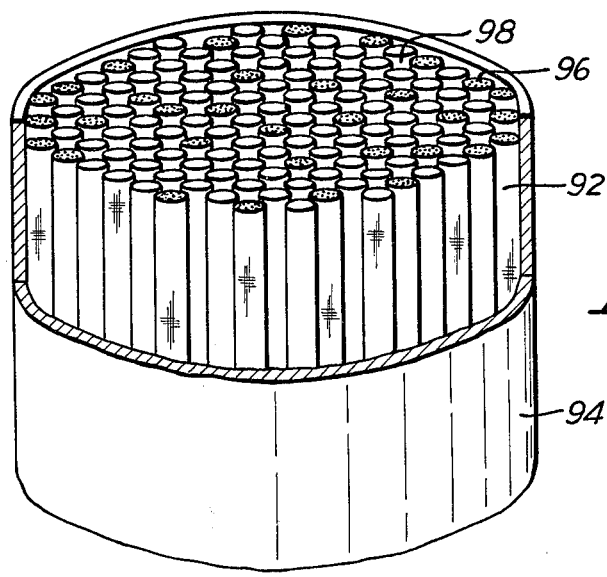

In FIG. 5, a set of porous tubes 92 arranged in a symmetrical or random pattern are placed inside a reactor shell 94. The walls of the tubes are provided with openings large enough to permit the transfer of reactants (including solids) and products therethrough while retaining catalyst particles 96 therein. The unobstructed passageways 98 are parallel to the direction of flow of charge stock through the reaction vessel. The tubes are maintained in position by a collar which is not shown in FIG. 5. The tubes may be from about ¼ inch to about 4 inches or more in diameter. The tubes may be formed from screen wire.

FIGS. 1 to 5 show cylindrical-type multi-partitioned reaction vessels since reactors of this configuration are more common. It should be understood, however, that the geometrical shape is not critical and that square, rectangular, octagonal, elliptical, etc., designs can be employed. It is only necessary that the reaction vessel contain a plurality of closely-spaced, substantially-vertical reaction zones, separated by porous partitions wherein a portion of the zones are adapted to contain solid particulate catalyst which will not pass through the porous partitions. Another portion of the reaction zones form substantially unobstructed passageways through the reaction vessel. In the figures shown, the unobstructed passageways form an alternating symmetrical pattern with the catalyst-containing portions of the reaction vessel. While this is a preferred type of reaction system, it is not essential that a symmetrical-type design be employed. Similarly, it is not critical as to the precise number of segments.

Figure 6:
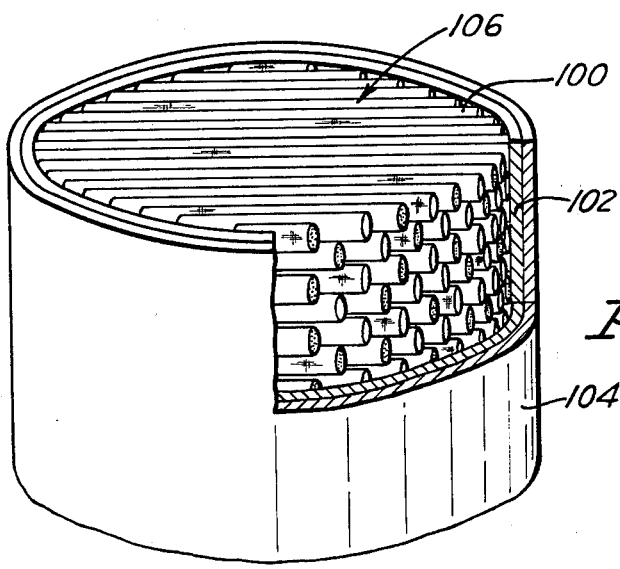

Although the process described herein has been illustrated with a plurality of closely-spaced, substantially-vertical reaction zones separated by porous partitions, it is within the purview of our invention also to carry out the process utilizing reaction zones identical to those described above but wherein said reaction zones are otherwise spatially disposed within the reaction vessel. For example, the reaction zones can be mounted substantially horizontally within the reaction vessel and the charge, defined herein, will still pass in and out of the catalyst segments and the desired hydrogenation reaction will still take place. The disposition of reaction zones within a reaction vessel, in one such embodiment, is illustrated in FIG. 6, wherein there is disposed a set of porous tubes 100, similar in design and spacing to porous tubes 92 of FIG. 5, but wherein said latter tubes are securely attached, by any suitable means, to a shell 102 removably positioned within reactor shell 104 to form a tube bundle 106 which is horizontally disposed within reactor shell 104. If desired, more than one such tube bundle 106 can be disposed within the reaction vessel, one above the other.

Figure 7:
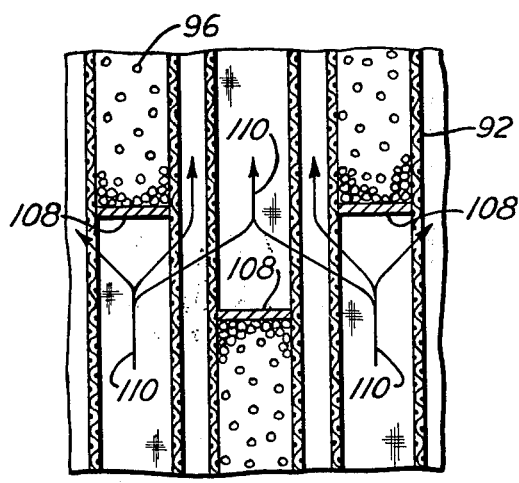
Figure 8:
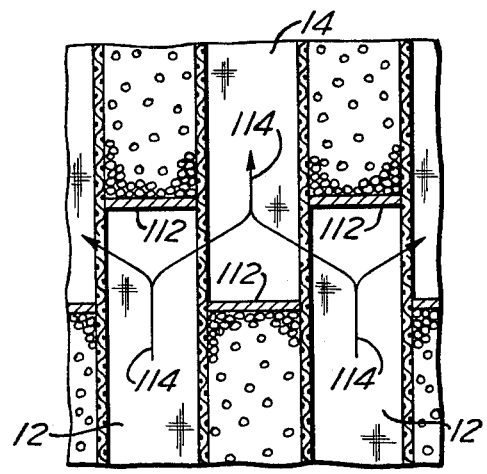

The catalyst beds need not be fully filled with catalyst in order to obtain the desired results herein. As shown in FIG. 7, if porous tubes 92 are used, as in FIG. 5, the catalyst 96 will partially fill the tubes 92 and be retained in place by plates 108. The direction of movement in such case is exemplified by arrows 110. This modification is further illustrated in FIG. 8, wherein the segmented bed arrangement of FIG. 1 is used. In this case some catalyst is in each of adjacent segments 12 and 14 but does not fully fill each of said segments. The catalyst is maintained in place by plates 112 and the arrangement is such that the desired movement of reaction material, as shown by arrows 114, takes place. The amount of catalyst present in the embodiments of FIGS. 7 and 8 will correspond substantially to the amount in the corresponding embodiments of FIGS. 1 and 5, respectively.

The number of catalyst segments and unobstructed passageways in the reaction vessel can vary over a wide range depending upon the size of the vessel. Naturally, as the diameter of the reaction vessel increases, the number of catalyst-containing segments can also be increased. While there may be as few as one catalyst segment, there may be as many as about 10,000. For example, in a commercial unit having a reaction vessel that is 15 feet in diameter, we may employ from about 200 to about 2,000 porous catalyst-containing tubes of the type referred to in FIG. 5. In a 2-inch diameter reaction vessel of the type shown in FIG. 1, we may have 4 sectorial-shaped catalyst-containing segments. In general, the total cross-sectional area of the catalyst segments should be such that the entire catalyst is available for contact with fluid passing through the reaction vessel. If the cross-sectional area of any single catalyst segment is too large, the charge stock will not have easy access to and from the catalyst segments, thus tending to give rise to coking and plugging in the catalyst segments. Thus, it is preferred that the ratio of cross-sectional area of an individual catalyst segment to the total cross-sectional area of all catalyst segments be as low as possible. Naturally, there is an economic limit to the number of individual catalyst segments which can be employed. With smaller, i.e., 2-inch, reaction vessels, the ratio of the cross-sectional area of one catalyst segment to the total of all catalyst segments is about 1:4. In larger reaction vessels, i.e., about 10 to about 15 feet, the ratio of the cross-sectional area of one catalyst segment to the total area of all catalyst segments is in the order of about 1:20 to about 1:10,000 or more.

The cross-sectional area of any particular catalyst segment is also dependent upon the size of the reaction vessel. Thus, the cross-sectional area of a single catalyst segment can vary from about 0.5 square inches for a small vessel to about 50 square inches for a large reaction vessel. In general, the cross-sectional area for a single catalyst segment is about 1 to about 30 square inches.

The ratio of the cross-sectional area of total catalyst segments to total unobstructed passageways can vary over a wide range depending upon the size of the reaction vessel. In general, the ratio of the total cross-sectional area occupied by catalyst to the total cross-sectional area of unobstructed passageways is about 10:1 to about 1:10. Since the length of the catalyst segments and the length of the unobstructed passageways in any given reaction vessel are the same, the volumetric ratio of total catalyst to total unobstructed passageways is the same as the cross-sectional area ratios, i.e., about 10:1 to about 1:10. The ratio of the total cross-sectional area occupied by catalyst to the total cross-sectional area (occupied and unoccupied) of the reaction vessel is also about 10:1 to about 1:10, preferably about 3:1 to about 1:3. As noted hereinabove, the catalyst segments are preferably parallel to each other and to the unobstructed passageways and have a uniform cross-sectional area throughout the reaction vessel. It will be understood, however, that catalyst segments of varying cross-sectional areas can be employed. Thus, in FIG. 5, tubes of various sizes can be employed in constructing the reaction vessel.

The size of the openings in the porous partitions separating the catalyst segments from the unobstructed passageways can vary. The openings can be sufficiently large to permit the passage of solids from the unobstructed passageways to the catalyst segments and then back again to the unobstructed passageways. As the charge stock passes through the reaction vessel, it passes in and out and through the various catalyst segments and unobstructed passageways an indeterminate number of times. The openings can be large enough to permit solids present in the charge to pass through but not large enough to allow catalyst particles to pass through. In general, the size of the openings in the porous partitions is within the range of about ½ inch to about 40-mesh sieve (U.S. Series), but usually the openings are from about 6 to about 20 mesh (U.S. Series). If the catalyst particles are ¼-inch diameter, the size of the openings in the partitions are just under ¼ inch in diameter. The configuration of the openings is not important and is dictated by the ease of fabrication of the partitions. Screen-like partitions have been used successfully to retain the catalyst while permitting easy passage of the coal slurry particles to and from the catalyst segments. In one embodiment of the invention, catalyst particles approximately ⅛ inch in diameter were retained where the porous partitions were made of screen wire having square openings approximately 0.079 inch on a side. The openings in the partitions can be circular, octagonal, square or any other shape. The ratio of open area to solid area in the porous partitions is preferably as high as possible consistent with good structural strength while retaining the catalyst particles.

The process of this invention can further be illustrated by the following. A solid-containing liquid hydrocarbon oil obtained from tar sands was charged into alternating sectorial segments of baskets which were housed in a 2-inch by 48-inch high reaction vessel similar to that shown in FIG. 1. The total volume of catalyst charged in the baskets was approximately 1200 cc (800 grams). The total volume of the reaction vessel was 3500 cc. Thus, the ratio (both volume and cross-sectional area) of total catalyst charge to total reaction vessel volume (and cross-sectional area) was about 1:3. The catalyst used was a three-metal component catalyst (10 weight per cent cobalt, 0.5 weight per cent nickel and 0.8 weight per cent molybdenum) composited with alumina having a particle size of 4 to 10 mesh (U.S. Series). The openings in the tubes separating the unobstructed passageways from the catalyst bed segments were square in shape (10 mesh screen). The oil was charged to the reaction vessel at an average feed rate of 2.5 pounds per hour. Hydrogen was introduced into the reactor at a rate of 10,000 SCF/BBL of oil. The reaction vessel was maintained at a temperature of 800° F. and a pressure of 2000 pounds per square inch gauge. The reaction was permitted to proceed for 48 hours. Overhead from the reaction vessel was separated into a gas stream and a liquid stream, with the gas stream consisting essentially of hydrogen and the liquid stream consisting essentially of upgraded oil-containing solids. The solids in the charge and product were similar and were found to be mostly sand and clay-type minerals. The composition of the charge and the liquid product issuing from the reactor are set forth below in Table II.

Table II

|  | Feed | Product |
|---|---|---|
| Gravity, °API | 8.1 | 19.5 |
| Viscosity, Cs, 210°F. | 206 | 9.72 |
| Carbon, Weight Per Cent | 82.98 | 86.26 |
| Hydrogen, Weight Per Cent | 10.42 | 11.74 |
| Sulfur, Weight Per Cent | 4.60 | 1.06 |
| Nitrogen, Weight Per Cent | 0.46 | 0.25 |
| Pour Point, ASTM-D-97 | +70 | −45 |
| Solids Content, Weight Per Cent | 1.0 | 1.0 |

In each aspect tested, the treated oil was an improvement over the charge. These results are surprising. It would have been expected that because the reaction mixture is permitted to pass through substantially unobstructed passageways in its travel through the reaction zone a substantial amount of channeling would result, desired reactions would be inhibited thereby and that the desired upgrading would suffer. However, as the data herein show, the desired results are still obtained. In fact, by operating as defined an additional advantage was obtained and that is plugging of the reactor by the solids present in the reaction mixture did not take place.

While our invention has been described with reference to various specific examples and embodiments, it will be understood that the invention is not limited to such examples and embodiments and may be variously practiced within the scope of the claims hereinafter made.

We claim:

1. A process for the conversion of solid-containing liquid hydrocarbon oils, said solids containing in excess of about 50 weight per cent of inorganic components, which comprises introducing said solid-containing liquid hydrocarbon oils and hydrogen into a reaction vessel comprising a plurality of reaction zones separated by porous partitions, a portion of said zones containing a solid particulate hydrogenation catalyst which will not pass through said porous partitions and the remainder of said zones forming substantially unobstructed passageways through said reaction vessel and passing said liquid hydrocarbon oils and hydrogen through said unobstructed passageways and through said porous partitions into contact with said catalyst under hydrogenation conditions, whereby hydrogenation of said liquid hydrocarbon oils takes place.

2. The process of claim 1 wherein said reaction zones are substantially elongated and vartically disposed.

3. The process of claim 1 wherein said reaction zones are substantially elongated and horizontally disposed.

4. The process of claim 1 wherein said oil has been derived from coal, oil shale or tar sands.

5. The process of claim 4 wherein said oil has been derived from coal.

6. The process of claim 4 wherein said oil has been derived from oil shale.

7. The process of claim 4 wherein said oil has been derived from tar sands.

8. A process according to claim 1 further characterized in that the ratio of the cross-sectional area of one catalyst zone to the total cross-sectional area of all catalyst zones is about 1:4 to about 1:10,000.

9. A process according to claim 1 wherein the volume proportion of substantially unobstructed passageways to catalyst is in the range of about 20:1 to about 1:10.

10. A process according to claim 1 wherein the hydrogenation catalyst comprises at least one hydrogenating component selected from the group consisting of the metals, metal sulfides and/or metal oxides of (a) a combination of about 2 to about 25 per cent by weight molybdenum and at least two iron group metals where the iron group metals are present in such amounts that the atomic ratio of each iron group metal with respect to molybdenum is less than about 0.4 and (b) a combination of about 5 to about 40 per cent by weight of nickel and tungsten where the atomic ratio of tungsten to nickel is about 1:0.1 to 5, said hydrogenating component being composited with a porous support.

11. A process according to claim 10 wherein the hydrogenating component of the catalyst is a sulfided combination of molybdenum, nickel and cobalt.

12. A process according to claim 10 wherein the hydrogenating component of the catalyst is a sulfided combination of nickel and tungsten.

13. A process according to claim 1 wherein the reaction zones are maintained at a temperature between about 500° and about 900°F. and a pressure between about 500 and about 10,000 pounds per square inch gauge.

* * * * *